United States Patent [19]

Komoto

[11] Patent Number: 4,511,221

[45] Date of Patent: Apr. 16, 1985

[54] REFLEX ZOOM LENS HAVING APERTURE SCALE

[75] Inventor: Shinsuke Komoto, Tokyo, Japan

[73] Assignee: Asahi Kogaku Kogyo Kabushiki Kaisha, Tokyo, Japan

[21] Appl. No.: 451,914

[22] Filed: Dec. 21, 1982

[30] Foreign Application Priority Data

Dec. 25, 1981 [JP] Japan .............. 56-198671[U]

[51] Int. Cl.³ ............................ G02B 7/10
[52] U.S. Cl. .................... 350/423; 350/429; 350/448; 354/195.13
[58] Field of Search ............ 350/423, 427, 428, 429, 350/430, 442, 444, 448, 449, 450, 255, 519, 560, 570; 354/195.13, 289.11; 352/57, 59, 44, 53, 85, 140

[56] References Cited

FOREIGN PATENT DOCUMENTS

| 2061998 | 7/1972 | Fed. Rep. of Germany | 354/195 |
| 2338097 | 4/1974 | Fed. Rep. of Germany | 350/429 |
| 1157936 | 1/1958 | France | 354/195 |
| 122003 | 9/1981 | Japan | 350/255 |

*Primary Examiner*—Jon W. Henry
*Attorney, Agent, or Firm*—Sughrue, Mion, Zinn, Macpeak & Seas

[57] ABSTRACT

A reflex zoom lens assembly includes a reflection optical system in which the full-aperture F number varies with focal length. A zoom ring of the assembly includes an aperture scale correlated to the focal length.

8 Claims, 6 Drawing Figures

REFLEX ZOOM LENS HAVING APERTURE SCALE

BACKGROUND OF THE INVENTION

This invention relates to the barrel of a zoom lens employing a reflection-type optical system and having an aperture scale.

A zoom lens employing a reflection-type optical system has not yet been commercially produced; however, the same is the subject of U.S. Pat. No. 4,445,756 to the instant applicant.

Heretofore, a lens employing a reflection-type optical system has been mainly realized as a supertelephoto lens because it has less chromatic aberration and is considerably compact. However, it is disadvantageous in that, since the second mirror at the center of the lens blocks light, it is impossible to provide aperture means for the lens. Accordingly, with such a lens, the quantity of light is adjusted by the use of an ND filter. In order to replace the ND filter, threads are formed in the rear portion of the lens, or a filter insertion mechanism is provided. Alternatively, the lens may incorporate a turret type filter assembly. However, these methods are disadvantageous in that replacement is troublesome, the internal construction of the device is intricate, and the filter cannot be built into a small, light lens.

SUMMARY OF THE INVENTION

In view of the foregoing, this invention is intended to utilize the variation in the full-aperture F number of a zoom lens employing a reflection-type optical system, to readily detect a variation in the quantity of light with a variation in focal length, to thereby readily adjust the quantity of light.

DETAILED DESCRIPTION OF THE PREFERRED EMBODIMENTS

Figure 1:
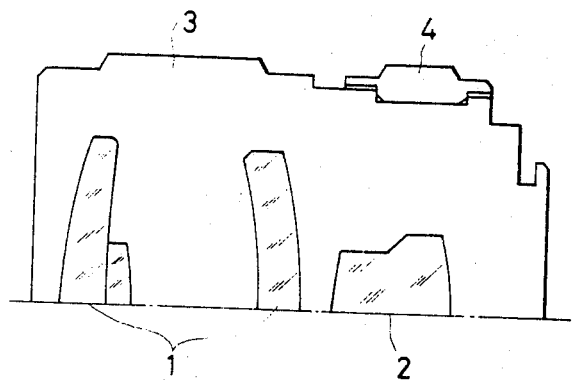
FIG. 1 is a longitudinal sectional view of a reflex zoom lens.
Figure 2:
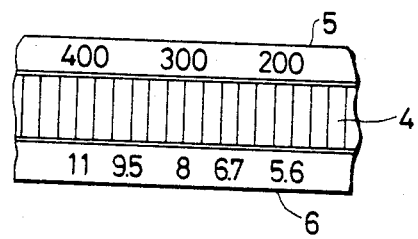
FIGS. 2 and 3 are planar projections showing parts of two embodiments of this invention.
Figure 3:
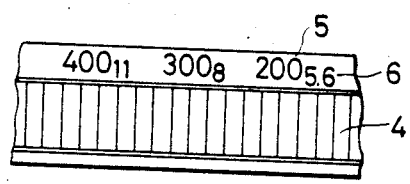

FIG. 1 shows a zoom lens 3 using a reflection-type optical system 1 and transmission optical system 2. More specifically, FIG. 1 is a longitudinal sectional view of a reflex zoom lens, the focal length of which can be changed by operating a zoom ring 4. FIG. 2 is a plane-projected diagram showing a part of the zoom ring 4. A focal length scale 5 and an aperture scale 6 corresponding to the focal length are provided on either side of a knurled operating part, respectively. FIG. 3 is a plane-projection showing a part of the zoom ring 4, which has both the focal length scale 5 and the aperture scale 6 on one side of the knurled portion.

Figure 4:
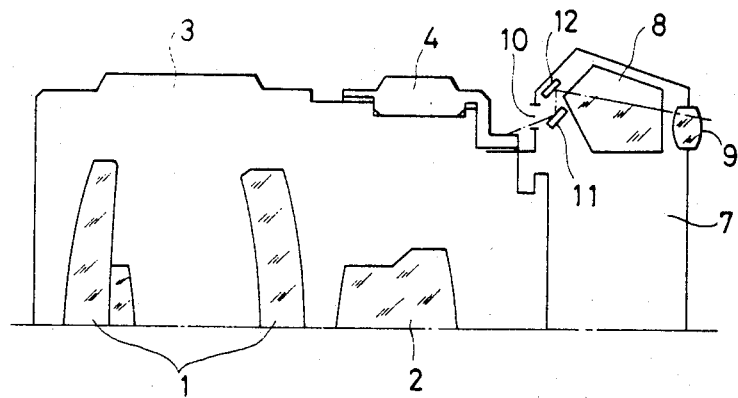
FIG. 4 is a longitudinal sectional view of a third embodiment of this invention, as connected to a camera body.

FIG. 4 is a longitudinal sectional view showing the reflex zoom lens as connected to the single-lens reflex camera body. The aperture scale 6 on the zoom ring 4 is observed in the finder through an aperture scale confirming window 10, reflecting mirrors 11 and 12, a pentaprism 8 and a finder magnifier 9.

Figure 5:
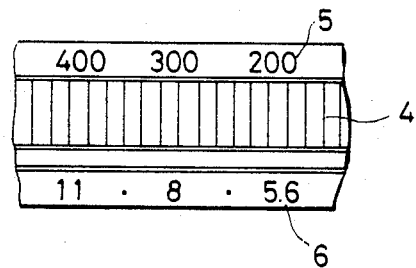
FIG. 5 is a planar projection showing part of the zoom ring of FIG. 4.

FIG. 5 is a planar diagram showing a part of the zoom ring 4 of FIG. 4. This zoom ring 4 is also provided with a focal length scale 5 and an aperture scale 6. The aperture scale 6 is positioned (i.e. provided radially inwardly) so that it may be observed in the finder through the scale confirming window 10.

Figure 6:
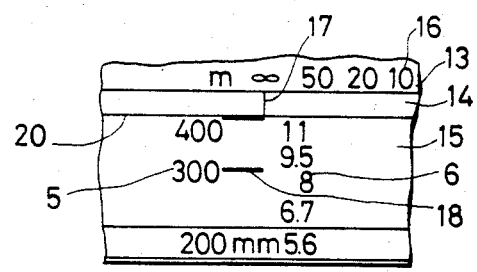
FIG. 6 is a planar projection showing part of a one-hand zoom lens.

FIG. 6 is a planar diagram showing part of a one-hand zoom lens which can achieve distance adjustment and zooming by operation of a single operating ring. The operating ring 13 has a distance scale 16. The index ring 14 is not rotated; however, it has an edge 20 for indicating the focal length and an index 17 for indicating the distance.

The stationary ring 15 has a focal length scale 5 and an aperture scale 6 corresponding to the focal length. A focal length index 18 and the edge 20 of the index ring 14 indicate the focal length and the F number on the aperture scale 6, respectively.

The aperture scale is provided in correspondence to the focal length as described above. Therefore, the zoom ring, which has theretofore been used merely to change the focal length, may also serve as a ring for changing the aperture value. Thus, the employment of the zoom lens ring as an aperture value changing ring can quickly adjust the optical intensity without using an ND filter. In using the lens, with the focal length being first in priority, an aperture value at each focal length can conveniently be detected at a glance. An identical effect can be obtained in the case of a one-hand zoom lens. In this case, one operating ring can achieve three functions; distance adjustment, focal length adjustment and aperture adjustment.

What is claimed is:

1. A reflex zoom lens, comprising in combination, a reflection-type optical system in which the full-aperture F number changes with focal length, an aperture scale including aperture indications, and a focal length scale including focal length indications, said aperture scale and said focal length scale being fixed relative to one another whereby said focal length indications and said aperture indications are fixedly juxtaposed.

2. A reflex zoom lens, as claimed in claim 1, in which said aperture scale is formed on a zoom ring of a lens barrel.

3. A reflex zoom lens, as claimed in claim 1, including a zoom ring having an operating part, respective sides of said part being provided with said aperture scale and said focal length scale, respectively.

4. A reflex zoom lens, as claimed in claim 1, and including a zoom ring, said focal length scale and said aperture scale being formed on one side of said zoom ring.

5. A reflex zoom lens, as claimed in claim 1, said aperture scale being positioned on a zoom ring of said lens in a manner such that said aperture scale is observable through an aperture scale confirming window provided on a camera body, when said lens is attached to said camera body.

6. A reflex zoom lens, as claimed in claim 1, in which said aperture scale is formed on a stationary ring of said lens.

7. A camera assembly, comprising; a reflex zoom lens including a reflection optical system in which the full-aperture F number changes with focal length, a zoom ring, and an aperture scale formed on said zoom ring, a camera body mounting said lens, said body including viewing means by which said aperture scale may be observed.

8. A reflex zoom lens, comprising; a reflection-type optical system in which the full-aperture F number changes with focal length, a zoom ring, and an aperture scale including aperture indications fixedly formed on said zoom ring.

* * * * *